United States Patent Office.

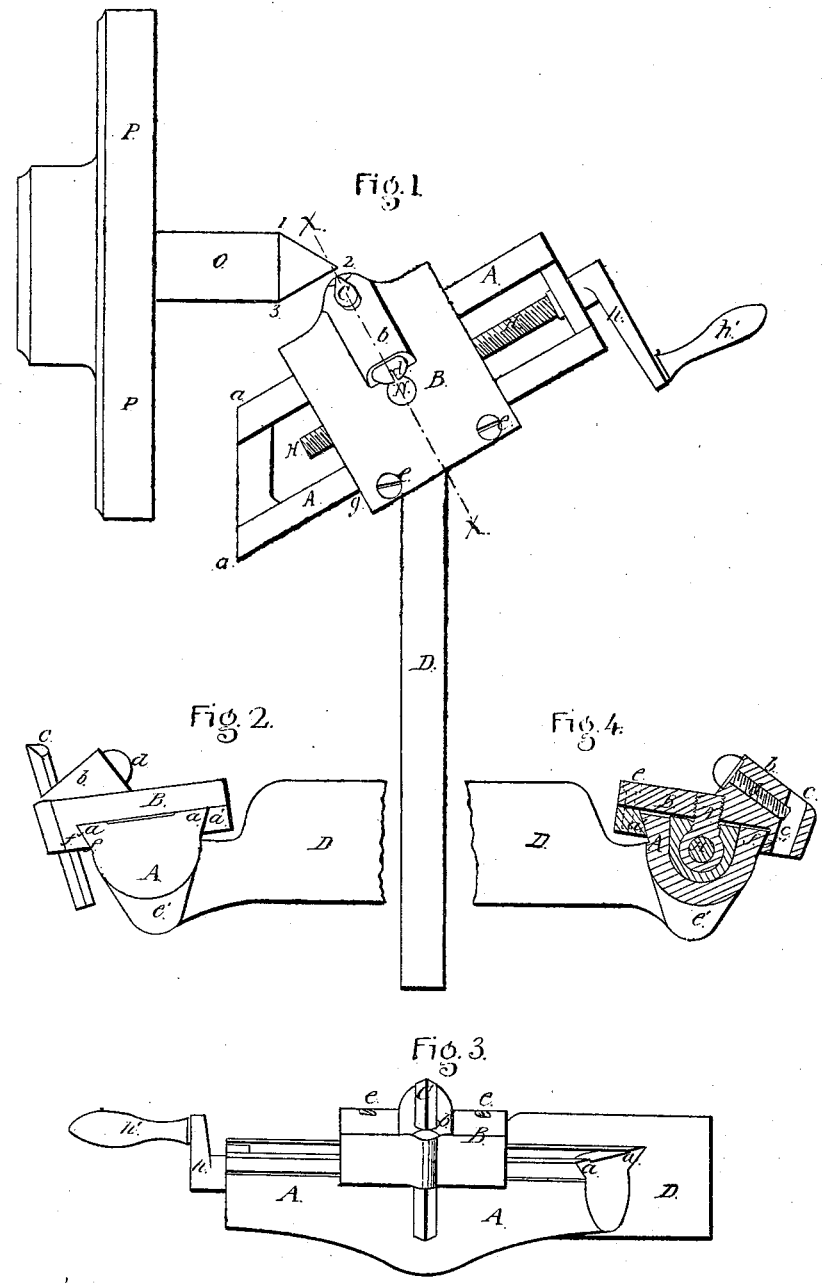

H. D. RICHARDSON, OF EAST HAMPTON, MASSACHUSETTS, ASSIGNOR TO HIMSELF AND J. W. WILSON, OF SAME PLACE.

Letters Patent No. 89,687, dated May 4, 1869.

IMPROVED TOOL FOR TURNING CENTRES.

The Schedule referred to in these Letters Patent and making part of the same.

*To all whom it may concern:*

Be it known that I, H. D. RICHARDSON, of East Hampton, in the county of Hampshire, and Commonwealth of Massachusetts, have invented a new and improved Tool for Turning Centres and other bevelled surfaces; and I do hereby declare that the following is a full, clear, and exact description thereof, reference being had to the accompanying drawings, making a part of this specification, and to the letters and figures of reference marked thereon, in which—

Figure 1 is a plan view of said invention, the face-plate of a lathe and centre, inserted therein, being shown in red lines, and in about the relative position to the tool which they might occupy in a lathe, the end of the cutting-tool being slightly drawn back from a cutting-position;

Figure 2 is an end view, showing the end nearest the face-plate;

Figure 3 is a front elevation of said tool; and

Figure 4 is an oblique sectional view, the plane of vertical section being indicated by the line X X in fig. 1.

In lathe-work, it is frequently necessary to turn up the bevelled end of that small appliance of a lathe called a centre, which is firmly inserted in the slightly-conical opening in the face-plate, as an axis about which the work in the lathe revolves, a small hole being drilled or punched in the end of the work, to receive the point of the centre.

These points are continually becoming worn while in use, and have to be re-turned in the lathe, and it is upon the absolute coincidence of the point of the centre with the axis of the face-plate that the accuracy of the work which may be turned upon this centre depends.

It is obvious that the accurate turning of such a tool by hand is a difficult matter, and that there will be a great liability to carry the point of the centre out of the line of the axis, so long as the turning-tool is controlled by the hand and eye.

It is also obvious that even if the apex of the centre should be made axial with the face-plate, the bevel of the angular ends of the different centres, or of the same centre at different turnings, would vary somewhat, even if turned by the same hand; and, further, that any effort to control the turning-tool so as to produce perfect centres, without a special device for the purpose, would consume much time, and require skilled and expensive labor, with a chance for failure still existing.

The purpose of my invention is to construct a simple and durable tool, for turning such centres with mathematical accuracy, and in such a manner as to prevent the possibility of falsely locating the point of the centre, and thereby damaging the work which is made to revolve upon it in the lathe.

Other applications of the same tool besides the turning of centres may be made, but the description of the latter operation is believed to convey a complete idea of the application of the device to the turning of other like bevelled surfaces.

The construction of my invention is as follows:

The supporting parts of the tool are the shank D and the bed-piece A, both cast in one piece.

The shank D is made of the proper width and thickness to enter the vertical slot in the tool-post of the lathe upon which it is to be used.

The upper sides of A and its edges a a are planed and smoothly finished, to serve as ways for the plate B, which is held down upon A by f and by the piece a', screwed to the under side of B, so that the plate B slides readily along A, like the tail-block of a lathe.

In the outer end of B is formed a socket for the cutting-tool C, which may be of any desired form, and is held in place by the set-screw d.

To move the plate B and tool C back and forth along the bed-piece A, the latter is provided with a feed-screw H, turned by a winch, h h', and propelling the plate B, by means of the nut N, fastened to the under side of B.

The angle of inclination of the sides of the bevelled end of the centre being, say thirty degrees, it is necessary to have some means of setting the bed-piece A at the same angle to the length of the lathe, so that the cutting-tool C, as it is fed along the bed-piece, by turning the feed-screw H, may move at the same angular inclination to the axis of the face-plate.

This I effect by forming that end of A which comes next to the face-plate P angular to the sides of A, the angle being sixty degrees, if the aforesaid inclination of thirty degrees is wanted for the end of the centre.

It is evident that if a centre is to be turned, the operator has only to set the proper tool C in the tool-socket, and place the shank D in the tool-post of the lathe, and then to slide the whole toward the face-plate P, until the end a' a of the bed A rests squarely against the face-plate, and thus sets the bed at the proper angle, which can then be preserved through all the movements which may be given to it by the other attachments of the lathe.

By working the feed-screw H, the tool C may be moved to and along the end of the centre, and must move so as to turn off the end of O at the proper angle of thirty degrees, without a possibility of mistake.

The dimensions of the whole tool may be varied with the work to which it is to be applied, the arrangement of the coacting parts remaining substantially the same.

Having described my invention,

What I claim as new, and desire to secure by Letters Patent, is—

The shank D and the bed-piece A, constructed of one piece, and of the form described, in combination with the sliding plate B, having a tool-socket therein, and the feed screw H, the whole arranged and operating substantially as set forth.

In witness whereof, I have hereunto set my hand, this 15th day of February, A. D. 1869.

H. D. RICHARDSON.

Witnesses:
GEO. S. CLARK,
HUGO OBEREMPT.